May 30, 1933.  E. V. TAYLOR  1,911,482

BRAKE

Filed Nov. 30, 1928

INVENTOR.
EUGENE V. TAYLOR
BY
ATTORNEYS.

Patented May 30, 1933

1,911,482

UNITED STATES PATENT OFFICE

EUGENE V. TAYLOR, OF CHICAGO, ILLINOIS, ASSIGNOR TO BENDIX BRAKE COMPANY, OF SOUTH BEND, INDIANA, A CORPORATION OF ILLINOIS

BRAKE

Application filed November 30, 1928. Serial No. 322,595.

This invention relates to brakes and is illustrated as embodied in an internal expanding brake for an automotive vehicle.

An object of the invention relates to the provision of a novel control means for the brake comprising, in combination with the usual brake drum, internal expanding shoes and backing plate, and a floating lever preferably mounted for substantially universal movement and adapted to transmit a lineal movement to a brake-operating plunger.

In one embodiment illustrated, the lever is supported by a novel fulcrum bracket mounted on the front axle and is provided at one end with a spatula-like cup-shaped member nesting within the bracket and disconnectedly engaging the plunger. The lever is so mounted as to be capable of movement in all planes, passing through and including the longitudinal center line of the lever when in released position, and is returned to its inoperative position by a conically shaped spring confined between the fulcrum bracket and a stop on the lever.

As a modification of my invention, I may mount my lever-supporting bracket directly on the brake backing plate or equivalent support and I may also translate the lineal motion of the actuating plunger into a rotary motion of a brake cam. This latter construction may be embodied in an internally square threaded cam meshing with the correspondingly threaded lineally movable plunger, the latter to be supported by a carrier bracket keyed to the plunger to obviate rotary motion thereof.

The above and other features of the invention will be apparent from the following description of the illustrative embodiments shown in the accompanying drawing, in which.

Figure 1:
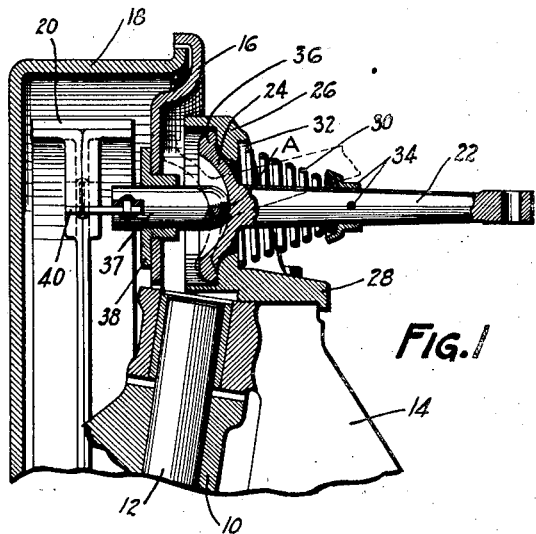
Figure 1 is a partial vertical section through my novel brake mechanism and associated parts.
Figure 2:
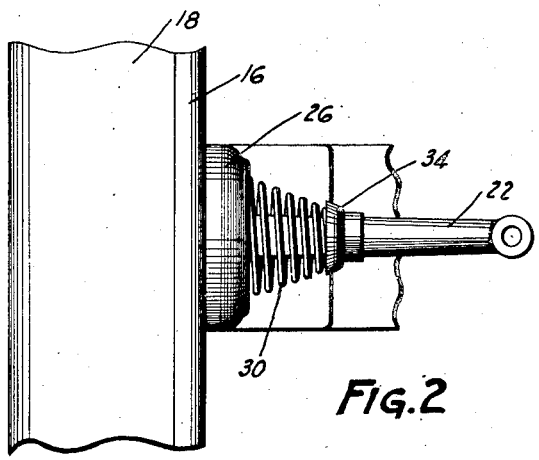
Figure 2 is a plan view of Figure 1.

As disclosed in Figure 1, I have embodied my invention in the usual front wheel construction comprising a steering knuckle 10 swiveled by a king pin 12 to the front axle 14 and supporting the backing plate or equivalent brake support 16. The wheel (not shown), supported by the spindle, is provided with the usual brake drum 18 which encompasses the shoes 20 of an internal expanding type of brake.

According to an important feature of my invention, I provide a novel control or actuator for the brake which may comprise a lever 22 having a semi-spherical cup-shaped enlarged end 24 nested within a two-diametered tubularly shaped bracket 26 having a boss 28 to detachably mount the bracket upon the end of the axle structure whereby it is supported in a non-swivelling relation with respect to the swivelling drum 18.

A conically shaped compression spring 30 is preferably confined between a recess 32 in one end of the bracket and a stop 34 pinned to the lever, which spring functions as a return spring for the lever.

The rim of the cup 24 is preferably enlarged at 36 and is adapted to fulcrum at any point about its seat on the bracket support.

In operation, motion of the lever 22, imparted by suitable transmission linkage to the service pedal, transmits a lineal movement to the cylindrical spherical ended plunger 37, the latter journaled in a backing plate bearing 38 and actuating a suitable toggle mechanism 40 to operate the brake shoes. I prefer to so proportion and arrange the several parts of the brake as to make the point of contact "A", Figure 1, outside the swiveling axis with the brake released. With the lever fulcruming on a portion of its rim, point "A" is then moved, as indicated by dotted lines in Figure 1, immediately adjacent the swiveling axis with the brake fully applied, thus obviating any impairment of the steering and providing a uniform braking unaffected by the swiveling movement.

By virtue of the substantially universal movement of the lever and its novel ball and socket connection with the operating plunger, effective operation of the lever is insured at all times substantially unaffected by relative movement of the sprung and unsprung parts of the vehicle affecting the relative position of the lever and plunger.

Figure 3:
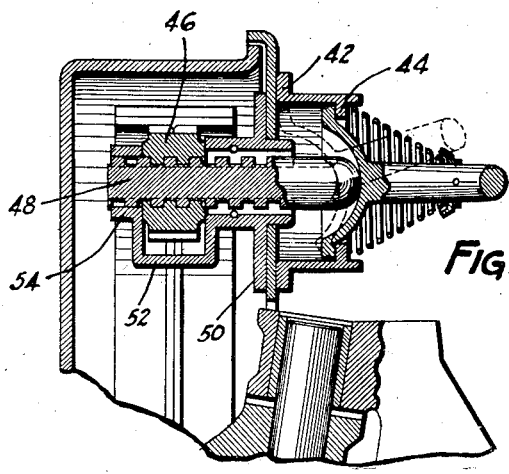
Figure 3 is a view similar to Figure 1 showing a modified form of support for the lever and a modified form of actuator within the brake support.

As disclosed in Figure 3, I may, as an alternative, attach the lever fulcrum bracket 42 directly to the backing plate, the rim of the lever contacting a flange 44 in the interior of the bracket. In all other respects the action is the same as previously indicated. I also suggest, in this modification, a novel cam and plunger mechanism preferably comprising an internally square threaded shoe-actuating cam 46 meshing with a correspondingly exteriorly threaded plunger 48, the latter splined to a tubular bearing 50 secured to the backing plate. Bearing 50 may be connected by a bridge member 52 to a smaller tubular bearing 54 supporting the end of the plunger.

In operation, translatory movement of the plunger effects a rotary movement to the cam through the intermediary of its threaded connection therewith. With release of the braking pressure, the return springs within the brake function to move the plunger back to its inoperative position.

While but two embodiments of my invention have been disclosed and described in detail, it is not my intention to limit the scope thereof to such embodiments or otherwise than by the terms of the subjoined claims.

I claim:

1. Mechanism for controlling brakes on the steering wheels of a vehicle comprising, in combination, a dirigible wheel mounted upon one end of an axle and provided with a brake drum mounted thereon, the latter encompassing an internal expanding brake secured to a brake support swiveling with the wheel, control means for said brake comprising a force-multiplying brake-operating device swiveling with the wheel and a non-swiveling co-operating part movable in all planes passing through and including the longitudinal center line of the part when in inoperative position, said non-swiveling part having a point of engagement with said force-multiplying part movable, in applying the brake, substantially in a plane perpendicular to the swiveling axis from an idle position spaced from that axis to an active position substantially in that axis.

2. A vehicle having, in combination, a swiveled wheel having a brake, and operating connections for the brake including a force-multiplying brake-operating part swiveling with the wheel and a co-operating non-swiveling lever part co-axial with said swiveled part and so mounted as to have a substantially universal movement with respect to said swiveled part and operable to move said swiveled part substantially at right angles to the plane of the wheel.

3. A vehicle having, in combination, a swiveled wheel having a brake and operating connections for the brake including a laterally extending part swiveling with the wheel and a non-swiveling lever member mounted in prolongation with said swiveled part and operable to move said swiveled part lengthwise to apply the brake.

4. A vehicle having, in combination, a swiveled wheel having a brake and control means for said brake comprising, in combination, a laterally directed plunger part swiveling with the wheel and a non-swiveling lever part co-axial with and disconnectedly engaging said plunger and so constructed and arranged as to have a substantial universal movement relative to said plunger.

5. A vehicle brake control mechanism comprising, in combination, co-axial swiveling and non-swiveling parts having a ball-and-socket connection, one of said parts functioning as a lever and the other as a lengthwise-movable plunger.

6. A vehicle having a swiveled wheel with a drum, and, in combination therewith, a brake engageable with the drum, together with applying means for the brake including a force-multiplying mechanism swiveling with the wheel and including a laterally movable plunger having a spherically shaped end, in combination with a cup-shaped lever part disconnectedly engaging said spherical end and lying in prolongation therewith in its inoperative position.

7. Mechanism for controlling brakes comprising, in combination, a brake support having a fitting therein acting as a bearing for a brake-operating plunger, a bracket support mounted on one end of the front axle and a lever member mounted in and supported by said bracket, said lever member disconnectedly engaging said plunger and further characterized by being so constructed and arranged within said bracket as to be substantially unaffected by relative movement of the sprung and unsprung parts of the vehicle.

8. A brake structure comprising, in combination, a brake support plate, a brake-operating laterally movable plunger part journaled in said plate, together with a lever member having a ball-and-socket connection with said plunger.

9. In a brake mechanism, a brake drum, a closure plate therefor, a friction device mounted within said plate and operating means for said friction device within said plate comprising a rotatable cam, a non-rotatable plunger member so connected to the cam as to effect by a translatory movement thereof a rotary movement to said cam, together with a lever member without said plate effecting said translatory movement to said plunger.

10. A brake-operating mechanism comprising, in combination, a rotatable cam provided with an internal thread having a meshing engagement with an externally threaded lineally and non-rotatably movable plunger.

11. A cylindrical plunger member characterized by an external square thread and rounded at one end thereof, in combination with an operating device in thrust engagement with said end for moving the plunger member lengthwise, and means meshing with said thread and turned by lengthwise movement of the plunger member.

12. For use in combination with a vehicle, an axle, a drum swivelled on said axle, a backing plate for said drum, a circular bracket mounted on the axle, a lever having a cup shaped enlarged head mounted for universal movement on the bracket, a plunger journalled in the backing plate and swiveling therewith and contacting with the interior of the cup-shaped end of the lever.

In testimony whereof, I have hereunto signed my name.

EUGENE V. TAYLOR.